US010995669B2

(12) United States Patent
Myatlev et al.

(10) Patent No.: US 10,995,669 B2
(45) Date of Patent: May 4, 2021

(54) NOZZLE FOR COMBUSTORS AND GAS TURBINE INCLUDING THE SAME

(71) Applicant: DOOSAN HEAVY INDUSTRIES & CONSTRUCTION CO., LTD., Changwon-si (KR)

(72) Inventors: Alexander Myatlev, Gimhae-si (KR); Hanjin Jeong, Gimje-si (KR); Borys Shershnyov, Changwon-si (KR)

( * ) Notice: Subject to any disclaimer, the term of this patent is extended or adjusted under 35 U.S.C. 154(b) by 111 days.

(21) Appl. No.: 16/393,735

(22) Filed: Apr. 24, 2019

(65) Prior Publication Data

US 2019/0368420 A1 Dec. 5, 2019

(30) Foreign Application Priority Data

May 30, 2018 (KR) .................. 10-2018-0062021

(51) Int. Cl.
| | | |
|---|---|---|
| F02C 7/00 | (2006.01) | |
| F02C 7/18 | (2006.01) | |
| F01D 25/12 | (2006.01) | |
| F23R 3/04 | (2006.01) | |
| F02C 7/22 | (2006.01) | |
| F23R 3/28 | (2006.01) | |

(52) U.S. Cl.
CPC .............. F02C 7/18 (2013.01); F01D 25/12 (2013.01); F02C 7/22 (2013.01); F23R 3/04 (2013.01); F23R 3/283 (2013.01)

(58) Field of Classification Search
CPC .. F23R 3/04; F23R 3/283; F23R 3/286; F23R 3/12; F02C 7/22; F23D 11/383
See application file for complete search history.

(56) References Cited

U.S. PATENT DOCUMENTS 3,648,457 A * 3/1972 Bobo .................. F23R 3/30
                                             60/737
3,904,119 A * 9/1975 Watkins ............... B05B 7/10
                                             239/405
(Continued)

FOREIGN PATENT DOCUMENTS

JP    S61-106718 U    7/1986
JP    08-145363 A    6/1996
(Continued)

OTHER PUBLICATIONS

A Korean Office Action dated Jul. 10, 2019 in connection with Korean Patent Application No. 10-2018-0062021 which corresponds to the above-referenced U.S. application.

*Primary Examiner* — Todd E Manahan
*Assistant Examiner* — Edwin Kang

(57) ABSTRACT

Disclosed herein are a nozzle capable of efficiently atomizing fuel, a combustor, and a gas turbine. The nozzle for the combustor includes a tube assembly including an air passage through which air moves, a main fuel passage disposed inside the air passage so that main fuel moves through the main fuel passage, and a pilot fuel passage disposed inside the main fuel passage so that pilot fuel moves through the pilot fuel passage as well as a nozzle tip configured to eject the pilot fuel and the main fuel, where the nozzle tip includes an injection passage coupled with the pilot fuel passage and a plurality of centrifugal flow chambers disposed outside the injection passage and communicating with the main fuel passage.

20 Claims, 10 Drawing Sheets

(56) References Cited

U.S. PATENT DOCUMENTS

| | | | | |
|---|---|---|---|---|
| 5,255,508 A | * | 10/1993 | Davis | F23D 11/38 |
| | | | | 60/740 |
| 6,267,583 B1 | * | 7/2001 | Mandai | F23D 23/00 |
| | | | | 431/278 |
| 6,715,292 B1 | * | 4/2004 | Hoke | F23D 11/107 |
| | | | | 239/404 |
| 7,251,940 B2 | | 8/2007 | Graves et al. | |
| 9,383,107 B2 | | 7/2016 | Shershnyov et al. | |
| 2010/0330521 A1 | * | 12/2010 | Krieger | F23D 11/107 |
| | | | | 431/354 |
| 2014/0190168 A1 | | 7/2014 | Shershnyov et al. | |
| 2015/0135716 A1 | | 5/2015 | Ginessin et al. | |
| 2016/0177835 A1 | * | 6/2016 | Tardif | F02C 7/222 |
| | | | | 60/776 |
| 2017/0261209 A9 | | 9/2017 | Ginessin et al. | |

FOREIGN PATENT DOCUMENTS

| | | |
|---|---|---|
| JP | 2000-039148 A | 2/2000 |
| JP | 2007-107707 A | 4/2007 |
| JP | 2017-106709 A | 6/2017 |
| KR | 10-1470774 B1 | 12/2014 |

\* cited by examiner

NOZZLE FOR COMBUSTORS AND GAS TURBINE INCLUDING THE SAME

CROSS-REFERENCE TO RELATED APPLICATION

This application claims priority to Korean Patent Application No. 10-2018-0062021, filed on May 30, 2018, the disclosure of which is incorporated herein by reference in its entirety.

BACKGROUND OF THE DISCLOSURE

Field of the Disclosure

Exemplary embodiments of the present disclosure relate to a nozzle for combustors and a gas turbine including the combustor.

Description of the Related Art

A gas turbine is a power engine configured to mix fuel with air compressed by a compressor, combust the mixture of the fuel and the compressed air, and rotate a turbine using high-temperature gas generated by the combustion. The gas turbine is used to drive a generator, an aircraft, a vessel, a train, and so forth.

Generally, the gas turbine includes a compressor, a combustor, and a turbine. The compressor draws external air thereinto, compresses the air, and then transmits it to the combustor. The air compressed by the compressor enters a high-pressure and high-temperature state. The combustor mixes fuel with the compressed air supplied from the compressor, and combusts the mixture of the fuel and the compressed air. Combustion gas generated by the combustion is discharged to the turbine. Turbine blades provided in the turbine are rotated by the combustion gas, whereby power is generated. The generated power may be used in various fields, e.g., for generating electricity, driving a mechanical device, etc.

SUMMARY OF THE DISCLOSURE

Fuel is discharged through a nozzle installed in each combustor. The nozzle may discharge liquid fuel. Typically, each nozzle may be formed of a liquid atomization nozzle for spraying a fixed quantity of liquid into a combustion chamber. There is a need for the nozzle to have a simple structure and be able to efficiently atomize the fuel. Furthermore, a front end of the nozzle through which pilot fuel and main fuel are discharged must be protected from heat generated in the combustor. If the front end of the nozzle overheats, a problem may arise in that a thermal barrier coating film formed on the nozzle is damaged.

To solve the problem and more, an object of the present disclosure is to provide a nozzle, a combustor and a gas turbine capable of efficiently atomizing fuel.

In accordance with one aspect of the present disclosure, a nozzle for a combustor may include: a tube assembly including an air passage through which air moves, a main fuel passage disposed inside the air passage so that main fuel moves through the main fuel passage, and a pilot fuel passage disposed inside the main fuel passage so that pilot fuel moves through the pilot fuel passage; and a nozzle tip configured to eject the pilot fuel and the main fuel, and including an injection passage coupled with the pilot fuel passage, and a plurality of centrifugal flow chambers disposed outside the injection passage and communicating with the main fuel passage, each of the plurality of centrifugal flow chambers being configured to form a vortex using centrifugal force.

The tube assembly may include: an outer tube; a first inner tube installed in the outer tube and configured to form the air passage between the first inner tube and the outer tube; and a second inner tube installed in the first inner tube and configured to form the main fuel passage between the first inner tube and the second inner tube, with the pilot fuel passage formed in the second inner tube.

The plurality of centrifugal flow chambers may be arranged at positions spaced apart from each other in a circumferential direction of the nozzle tip.

Each of the plurality of centrifugal flow chambers may have a pillar shape. A swirl port coupling the main fuel passage and the centrifugal flow chamber may be formed in the nozzle tip. The swirl port may be coupled to the centrifugal flow chamber at a position spaced apart from a width-direction center of the centrifugal flow chamber.

Each of the plurality of centrifugal flow chamber may include: an inner wall part having a tubular shape; a bottom part coupled to a rear end of the inner wall part and disposed to be inclined relative to the inner wall part; and a variable guide part coupled to a front end of the inner wall part and having an inner diameter that is gradually reduced toward a front end thereof.

A swirl port coupling the main fuel passage and the centrifugal flow chamber may be formed in the nozzle tip. A central axis of the swirl port may extend in a direction toward the inner wall part or in a tangential direction of the inner wall part.

An outer injection hole coupled with the variable guide part to eject the main fuel may be formed in the nozzle tip. An axial direction of the outer injection hole may be formed to be inclined outward relative to a central axis of the nozzle tip.

A heat shield cover covering the nozzle tip may be installed on the outer tube, and a cooling space may be formed between the heat shield cover and a front end of the nozzle tip.

The heat shield cover may include: a side surface partially covering the first inner tube; a front surface covering the front end of the nozzle tip and forming the cooling space between the front surface and the front end of the nozzle tip; and a connection surface coupling the side surface and the front surface and disposed to be inclined relative to the front surface, the connection surface forming a cooling flow passage between the connection surface and the nozzle tip.

An outer shield hole may be formed in the connection surface at a position spaced apart from the outer injection hole so that main fuel and air are discharged together through the outer shield hole, and an inner shield hole may be formed in the front surface at a position spaced apart from a front end of the injection passage so that pilot fuel and air are discharged together through the inner shield hole.

A flow guide member having a plurality of holes may be installed between the heat shield cover and the tube assembly, and the flow guide member may include an inner wall having an annular shape, an outer wall spaced apart from the inner wall, and a plurality of partitions coupling the inner wall and the outer wall.

A flow guide protrusion extending in a spiral shape from an outer portion thereof toward a center thereof may protrude on the front end of the nozzle tip.

A guide rib extending in a spiral shape may be formed on an inner surface of each of the centrifugal flow chamber.

A cartridge may be installed in the pilot fuel passage, and the cartridge may include a head having in an outer circumferential surface thereof a guide groove extending in a spiral shape.

The cartridge may further include a guide tube coupled with the head and having a diverging passage therein, wherein an inlet passage coupled with the diverging passage may be formed in a rear end of the guide tube, and a plurality of outlet passages coupled with the diverging passage may be formed in a circumferential surface of the guide tube.

In accordance with another aspect of the present disclosure, a combustor may include a burner having a plurality of nozzles configured to eject fuel and air, and a duct assembly coupled to one side of the burner and configured to combust the fuel and the air therein and transfer combustion gas to a turbine. The nozzle may include: a tube assembly including an air passage through which air moves, a main fuel passage disposed inside the air passage so that main fuel moves through the main fuel passage, and a pilot fuel passage disposed inside the main fuel passage so that pilot fuel moves through the pilot fuel passage; a nozzle tip configured to eject the pilot fuel and the main fuel, and including an injection passage coupled with the pilot fuel passage, and a plurality of centrifugal flow chambers disposed outside the injection passage and communicating with the main fuel passage; and a heat shield cover coupled with the air passage and installed to cover the nozzle tip, the heat shield cover being configured to form a cooling space between the heat shield cover and a front end of the nozzle tip and form a cooling flow passage between the heat shield cover and a side surface of the nozzle tip.

In accordance with yet another aspect of the present disclosure, a gas turbine may include a compressor configured to compress air drawn thereinto from an outside, a combustor configured to mix fuel with the air compressed by the compressor and combust a mixture of the fuel and the compressed air, and a turbine including a plurality of turbine blades configured to be rotated by combustion gas formed by the combustor. The combustor may include a burner having a plurality of nozzles configured to eject fuel and air, and a duct assembly coupled to one side of the burner and configured to combust the fuel and the air therein and transfer combustion gas to a turbine. The nozzle may include: a tube assembly including an air passage through which air moves, a main fuel passage disposed inside the air passage so that main fuel moves through the main fuel passage, and a pilot fuel passage disposed inside the main fuel passage so that pilot fuel moves through the pilot fuel passage; and a nozzle tip configured to eject the pilot fuel and the main fuel, and including an injection passage coupled with the pilot fuel passage, and a plurality of centrifugal flow chambers disposed outside the injection passage and communicating with the main fuel passage, each of the plurality of centrifugal flow chambers being configured to form a vortex using centrifugal force.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE EMBODIMENTS

Figure 1:
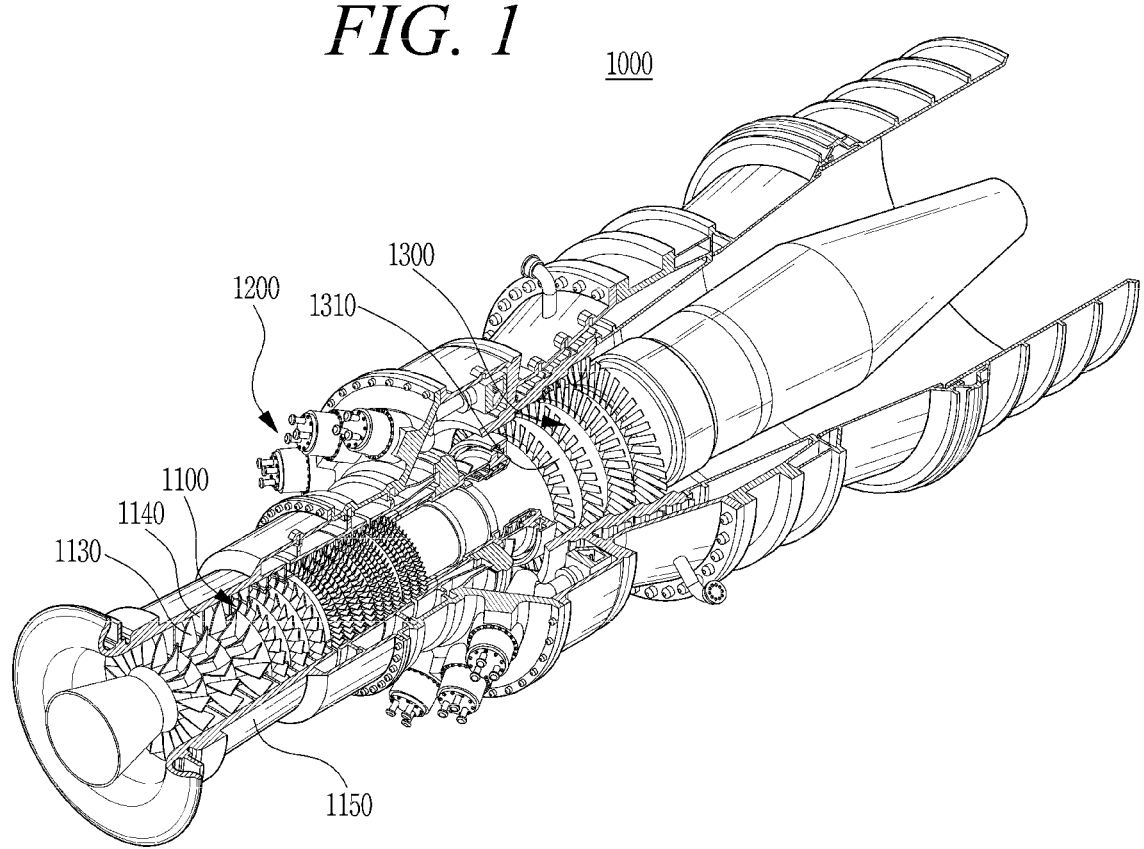
FIG. 1 is a diagram illustrating an internal structure of a gas turbine in accordance with the first embodiment of the present disclosure.

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Hereinafter, a gas turbine in accordance with the first embodiment of the present disclosure will be described.

Figure 2:
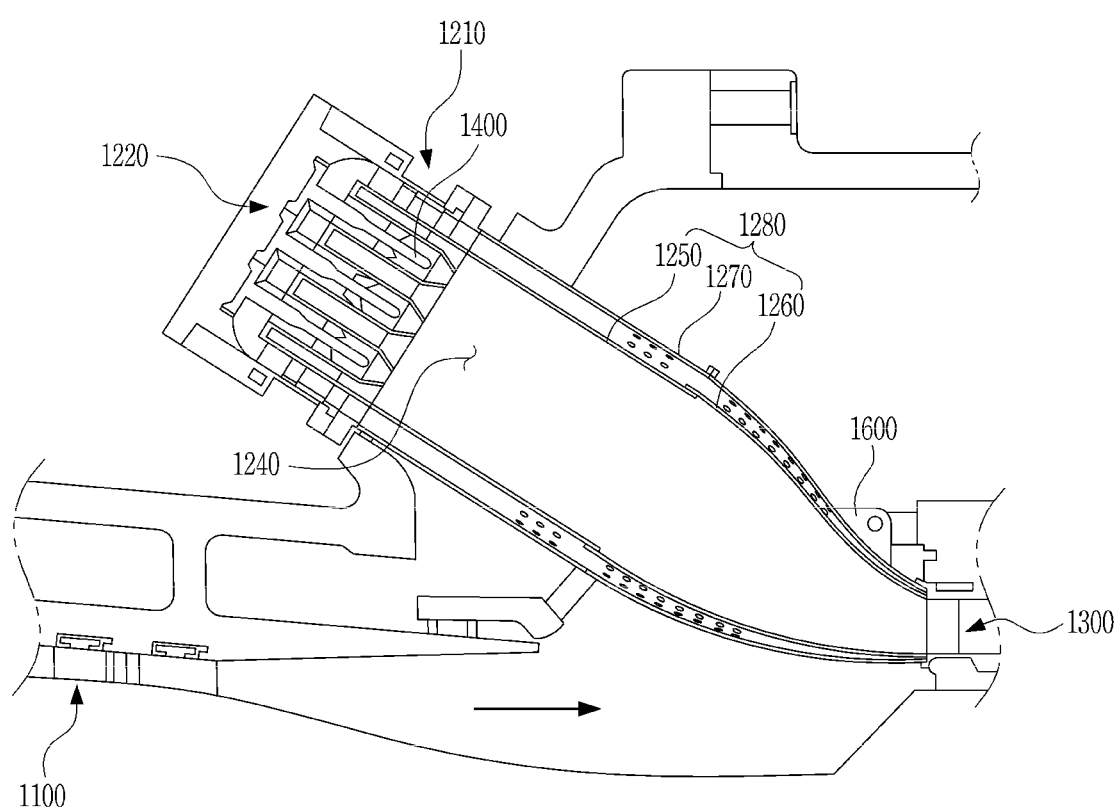
FIG. 2 is a diagram illustrating a combustor of FIG. 1.

FIG. 1 is a diagram illustrating an internal structure of a gas turbine in accordance with an embodiment of the present disclosure, and FIG. 2 is a diagram illustrating a combustor of FIG. 1.

The thermodynamic cycle of the gas turbine 1000 in accordance with the present embodiment may ideally comply with the Brayton cycle. The Brayton cycle may comprise four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air to a high pressure, combust fuel under isobaric conditions to emit thermal energy, expand this high-temperature combustion gas to convert the thermal energy of the combustion gas into kinetic energy, and thereafter discharge exhaust gas with residual energy to the atmosphere. As such, the Brayton cycle may comprise four processes including compression, heat addition, expansion, and heat rejection.

Embodying the Brayton cycle, the gas turbine 1000 includes a compressor 1100, a combustor 1200, and a turbine 1300, as illustrated in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw air from the outside and compress the air. The compressor 1100 may supply air compressed by compressor blades 1130 to the combustor 1200 and also supply air for cooling a high-temperature region needed to be cooled in the gas turbine 1000. Here, the drawn air is compressed in the compressor 1100 through the adiabatic compression process, so that the pressure and the temperature of the air passing through the compressor 1100 are increased.

The compressor 1100 is designed in the form of a centrifugal compressor or an axial compressor. Generally, the centrifugal compressor is used in a small gas turbine. On the other hand, in a large gas turbine, such as the gas turbine 1000 illustrated in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to compressor vanes 1140 disposed at a following stage. Air is compressed gradually to high pressures while passing through the blades 1130 formed in a multi-stage structure.

The compressor vanes 1140 may be mounted to an inner surface of a housing 1150 in such a way that a plurality of the compressor vanes 1140 form each stage. The compressor vanes 1140 guide compressed air transferred from the compressor blades 1130 disposed at the preceding stage, toward the blades 1130 disposed at the following stage. In an embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, as illustrated in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

The combustor 1200 may mix fuel with the compressed air supplied from an outlet of the compressor 1100 and combust the mixture through the isobaric combustion process to make combustion gas having high energy. FIG. 2 illustrates an example of the combustor 1200 applied to the gas turbine 1000. The combustor 1200 includes a combustor casing 1210, a burner 1220, a nozzle 1400, and a duct assembly 1280.

The combustor casing 1210 may enclose a plurality of the burners 1220 and have an approximately cylindrical shape. The burners 1220 may be disposed at a downstream side of the compressor 1100 and arranged along the combustor casing 1210 having an annular shape. A plurality of the nozzles 1400 are provided in each burner 1220. Fuel ejected from the nozzles 1400 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions suitable for reducing the amount of exhaust gas, such as carbon monoxide and nitrogen oxide, which should be regulated by law. Recently, use of a pre-mixed combustion scheme has increased because a combustion temperature can be reduced and uniform combustion is possible so that exhaust gas can be reduced, although it is difficult to control the pre-combustion.

In the case of the pre-mixed combustion, compressed air is mixed with fuel ejected in advance from the nozzles 1400, and then enters a combustion chamber 1240. Initial ignition of pre-mixed gas is performed by an igniter. Thereafter, if combustion is stabilized, the combustion is maintained by supplying fuel and air.

Referring to FIG. 2, compressed air flows along an outer surface of the duct assembly 1280, which is coupled between the burner 1220 and the turbine 1300 so that high-temperature combustion gas can flow through the duct assembly 1280, and then is supplied toward the nozzles 1400. During this process, the duct assembly 1280 heated by high-temperature combustion gas may be appropriately cooled.

The duct assembly 1280 includes a liner 1250, a transition piece 1260, and a flow sleeve 1270. The duct assembly 1280 has a double-shell structure, in which the flow sleeve 1270 encloses the outer surfaces of the liner 1250 and the transition piece 1260 which are coupled to each other. Compressed air enters an annular space defined in the flow sleeve 1270 and cools the liner 1250 and the transition piece 1260.

The liner 1250 is a tube member coupled to the burner 1220 of the combustor 1200, and an internal space of the liner 1250 forms the combustion chamber 1240. One longitudinal end of the liner 1250 is coupled to the burner 1220, and the other longitudinal end of the liner 1250 is coupled to the transition piece 1260.

The transition piece 1260 is coupled to an inlet of the turbine 1300 and functions to guide high-temperature combustion gas into the turbine 1300. One longitudinal end of the transition piece 1260 is coupled with the liner 1250, and the other longitudinal end of the transition piece 1260 is coupled with the turbine 1300. The flow sleeve 1270 functions to protect the liner 1250 and the transition piece 1260 and prevents high-temperature heat from being directly emitted to the outside.

Figure 3:
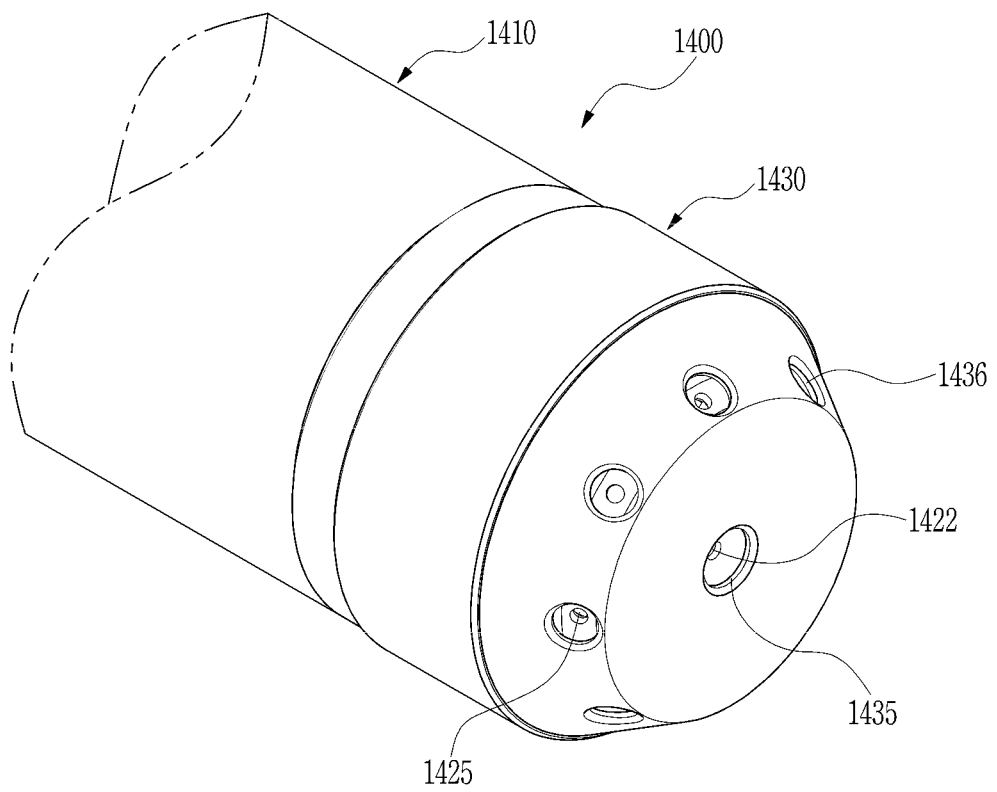
FIG. 3 is a perspective view illustrating a nozzle in accordance with the first embodiment of the present disclosure.
Figure 4:
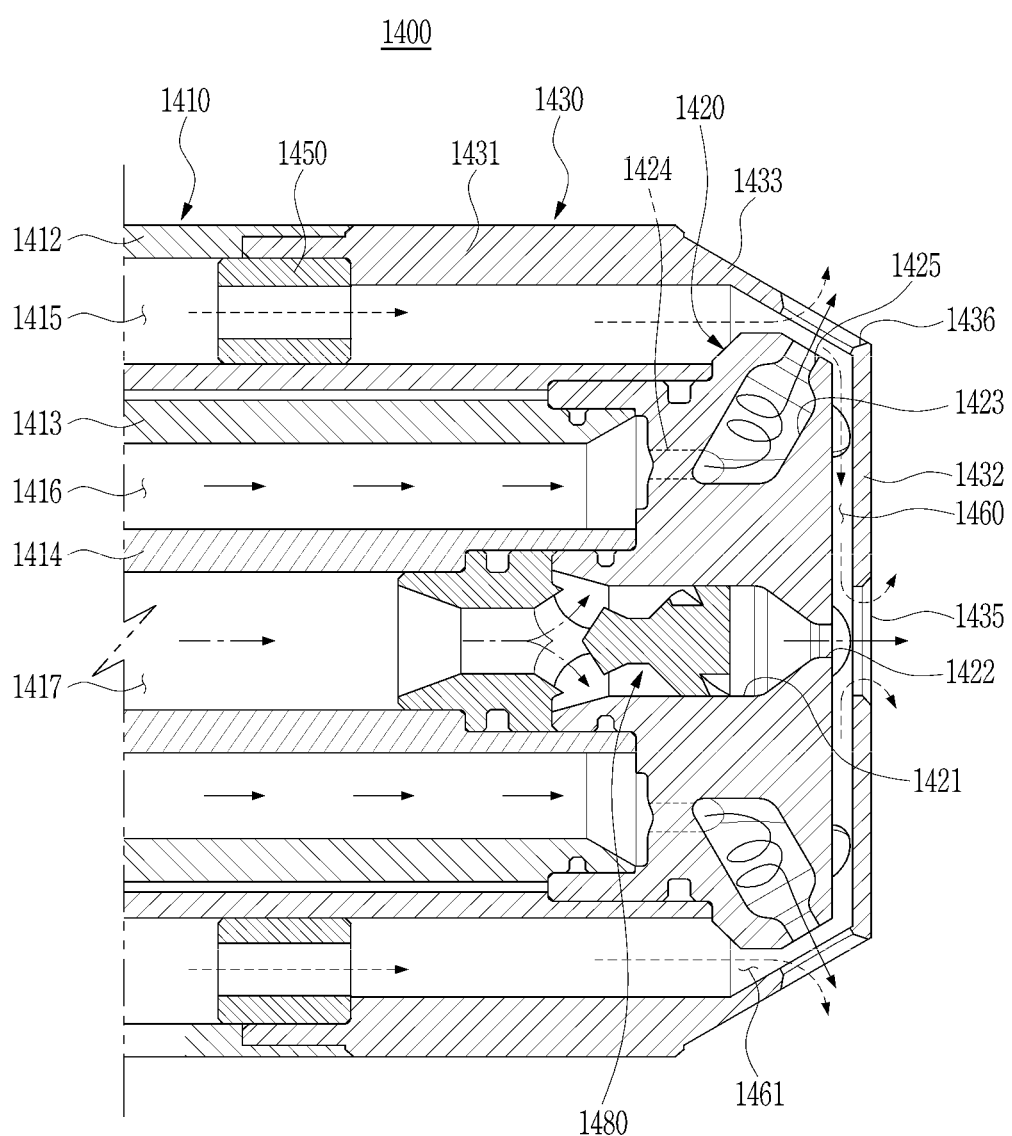
FIG. 4 is a sectional view of the nozzle in accordance with the first embodiment of the present disclosure.

FIG. 3 is a perspective view illustrating the nozzle 1400 in accordance with the first embodiment of the present disclosure, and FIG. 4 is a sectional view of the nozzle 1400 in accordance with the first embodiment of the present disclosure.

Referring to FIGS. 3 and 4, the nozzle 1400 in accordance with the first embodiment includes a tube assembly 1410 which forms an air passage 1415, a main fuel passage 1416, and a pilot fuel passage 1417, a nozzle tip 1420 which is coupled to a front end of the tube assembly 1410, and a heat shield cover 1430 which covers the nozzle tip 1420.

The tube assembly 1410 includes an outer tube 1412, a first inner tube 1413, and a second inner tube 1414. The outer tube 1412 may be formed of an approximately circular tube, and have an internal space. A shroud (not illustrated) for enclosing the outer tube 1412 may be installed outside the outer tube 1412 to guide the flow of air.

The first inner tube 1413 may be inserted and disposed in the outer tube 1412, and may be installed coaxially with the outer tube 1412. The first inner tube 1413 forms the air passage 1415 between it and the outer tube 1412. The first inner tube 1413 is formed of a circular tube, and has an internal space. The second inner tube 1414 may be inserted and disposed in the first inner tube 1413, and may be installed coaxially with the first inner tube 1413. The second inner tube 1414 forms a main fuel passage 1416 between it and the first inner tube 1413. The second inner tube 1414 may be formed of a circular tube, and the pilot fuel passage 1417 may be formed in the second inner tube 1414.

An emulsion-type mixture of water and fuel may be supplied into the main fuel passage 1416, and liquid fuel may be supplied into the pilot fuel passage 1417. Here, fuel may employ diesel, but the present disclosure is not limited thereto. Furthermore, gas fuel may be supplied into the main fuel passage 1416 or the pilot fuel passage 1417.

Figure 5:
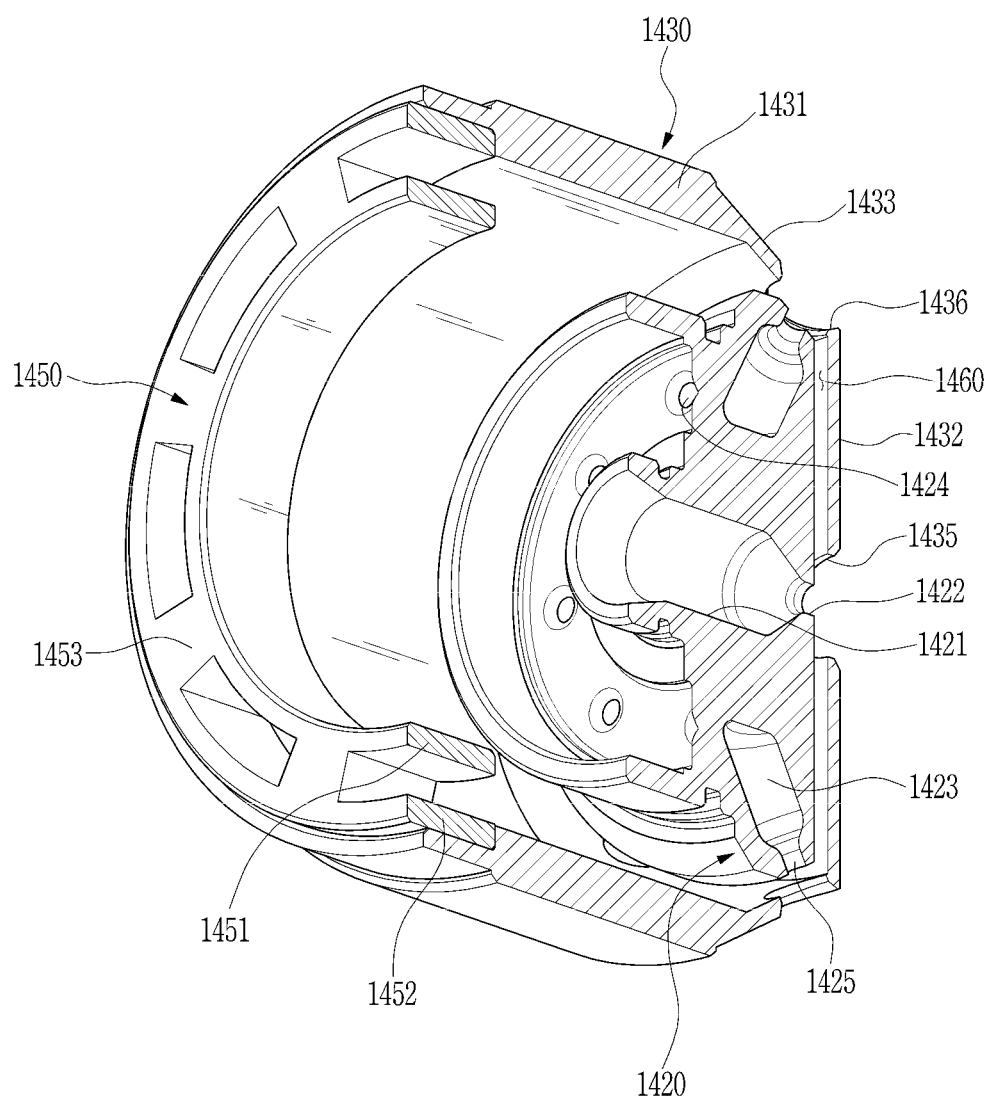
FIG. 5 is a sectional perspective view illustrating the nozzle in accordance with the first embodiment of the present disclosure.
Figure 6:
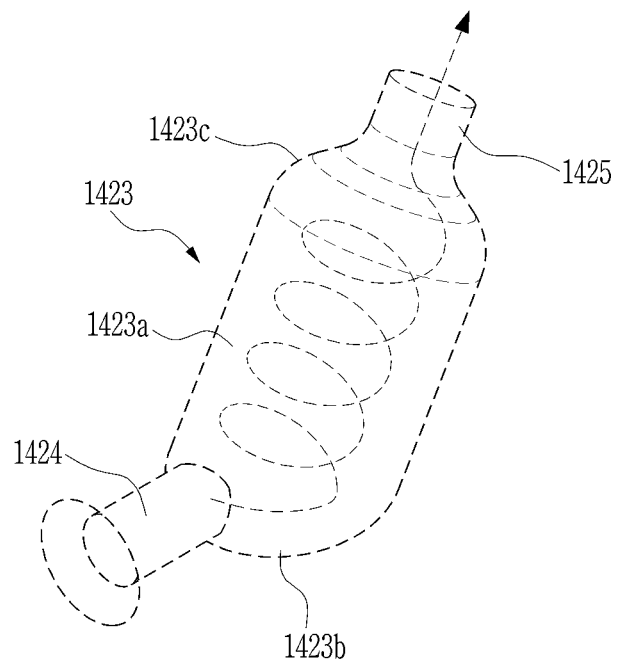
FIG. 6 is a perspective view illustrating a centrifugal flow chamber in accordance with the first embodiment of the present disclosure.

FIG. 5 is a sectional perspective view illustrating the nozzle 1400 in accordance with the first embodiment of the present disclosure, and FIG. 6 is a perspective view illustrating a centrifugal flow chamber in accordance with the first embodiment of the present disclosure.

Referring to FIGS. 4 to 6, the nozzle tip 1420 is inserted into the first inner tube 1413 and the second inner tube 1414 and coupled with the tube assembly 1410. An injection passage 1421 and a plurality of centrifugal flow chambers 1423 are formed in the nozzle tip 1420. The injection passage 1421 is coupled with the pilot fuel passage 1417. A plurality of centrifugal flow chambers 1423 are disposed outside the injection passage 1421 and coupled with the main fuel passage 1416. The nozzle tip 1420 may be manufactured by 3D printing.

The injection passage 1421 is formed in a central portion of the nozzle tip 1420, and an inner injection hole 1422 is formed in a front end of the injection passage 1421. The plurality of centrifugal flow chambers 1423 are arranged at positions spaced apart from each other in a circumferential direction of the nozzle tip 1420. Each of the centrifugal flow chambers 1423 may have a circular cross-section. The centrifugal flow chamber 1423 may have an approximately pillar shape, particularly, a cylindrical shape or an elliptic cylindrical shape. The centrifugal flow chamber 1423 is configured to form vortexes in main fuel supplied into the centrifugal flow chamber 1423.

The centrifugal flow chamber 1423 includes an inner wall part 1423*a* having a tubular shape, a bottom part 1423*b* coupled to a rear end of the inner wall part 1423*a* and disposed to be inclined relative to the inner wall part 1423*a*, and a variable guide part 1423*c* coupled to a front end of the inner wall part 1423*a* and having an inner diameter which is gradually reduced toward a front end thereof. The bottom part 1423*b* is formed to be inclined relative to the inner wall part 1423*a* so that a rear end side (based on the flow of air and fuel) of the inner wall part 1423*a* is longer than a front-end side thereof.

A swirl port 1424 which couples the main fuel passage 1416 and the centrifugal flow chamber 1423 is formed in the nozzle tip 1420. The swirl port 1424 is formed at position spaced apart from a width-direction center of the centrifugal flow chamber 1423. A part of the swirl port 1424 that is coupled to the main fuel passage 1416 may have a horn shape. The swirl port 1424 is coupled to the centrifugal flow chamber 1423 at a position adjacent to the bottom part 1423*b*. A cross-sectional area of the swirl port 1424 is sufficiently smaller than that of the centrifugal flow chamber 1423.

A central axis of the swirl port 1424 does not extend in a direction toward the center of the centrifugal flow chamber 1423 but may extend in a direction toward the inner wall part 1423*a* of the centrifugal flow chamber 1423 or in a tangential direction of the inner wall part 1423*a*. Consequently, main fuel ejected from the swirl port 1424 may come into contact with the inner wall part 1423*a* of the centrifugal flow chamber 1423 due to centrifugal force and spirally move along the inner wall part 1423*a*.

An outer injection hole 1425 coupled with the centrifugal flow chamber 1423 to inject fuel into the combustor is formed in the nozzle tip 1420. The outer injection hole 1425 is coupled with the variable guide part 1423*c*. An axial direction of the outer injection hole 1425 may be formed to be inclined outward from a central axis of the nozzle tip 1420. A central axis of the outer injection hole 1425 may be disposed to be inclined at an angle ranging from approximately 45° to approximately 60° with respect to the central axis of the nozzle tip 1420. The centrifugal flow chamber 1423 is coupled to the outer injection hole 1425 and thus may be provided in the form of a bottle, the bottom of which is inclined relative to the sidewall thereof.

According to the present disclosure described above, due to injection pressure and centrifugal force in the centrifugal flow chamber 1423, main fuel drawn into the centrifugal flow chamber 1423 through the swirl port 1424 thinly and widely spreads while forming vortexes along the inner wall of the centrifugal flow chamber 1423, and then may change into small particles and be sprayed through the outer injection hole 1425.

Six to eighteen centrifugal flow chambers 1423 may be formed in the nozzle tip 1420. As such, if main fuel is injected through the plurality of centrifugal flow chambers 1423 and the plurality of outer injection holes 1425, the main fuel may be more reliably atomized.

The heat shield cover 1430 is coupled with the outer tube 1412 and installed to cover the nozzle tip 1420. A flow guide member 1450 having a plurality of holes is installed between the heat shield cover 1430 and the outer tube 1412. The flow guide member 1450 includes an inner wall 1451 having an annular shape, an outer wall 1452 spaced apart from the inner wall 1451, and a plurality of partitions 1453 which couple the inner wall 1451 and the outer wall 1452.

The heat shield cover 1430 includes a side surface 1431 which partially covers the first inner tube 1413, a front surface 1432 which covers the front end of the nozzle tip 1420 and forms a cooling space 1460 between it and the front end of the nozzle tip 1420, and a connection surface 1433 which couples the side surface 1431 and the front surface 1432 and is formed to be inclined relative to the front surface 1432 to form a cooling flow passage 1461.

The cooling space 1460 is formed between the front end of the nozzle tip 1420 and the heat shield cover 1430. The cooling flow passage 1461 for transferring air into the cooling space 1460 is formed among an outer surface of the tube assembly 1410, the side surface of the nozzle tip 1420, and the heat shield cover 1430.

The heat shield cover 1430 is coupled with the air passage so that a passage through which air for cooling flows is formed between the heat shield cover 1430 and the nozzle tip 1420. An outer shield hole 1436 is formed in the connection surface 1433 at a position spaced apart from the outer injection hole 1425 so that main fuel and air are discharged together through the outer shield hole 1436. An inner shield hole 1435 is formed in the front surface 1432 at a position spaced apart from the front end of the injection passage 1421 so that pilot fuel and air are discharged together through the inner shield hole 1435.

Air may cool the nozzle tip 1420 while flowing along space defined inside the heat shield cover 1430. Furthermore, some of the air is discharged through the outer shield hole 1436, and the other air moves to a central portion of the heat shield cover 1430 and is discharged through the inner shield hole 1435.

In space between the outer injection hole 1425 and the outer shield hole 1436, air moves in a direction intersecting with a direction in which the main fuel is discharged, whereby the fuel may be more effectively atomized. In other words, although the main fuel moves in an axial direction of the outer injection hole 1425, air moves from the outside toward the outer shield hole 1436 and thereafter is discharged. Hence, the main fuel may be atomized at the junction between the flows of the main fuel and the air.

Furthermore, in space between the inner injection hole 1422 and the inner shield hole 1435, a direction in which air moves and a direction in which pilot fuel moves also intersect with each other. Hence, the pilot fuel may be more effectively atomized.

Figure 7:
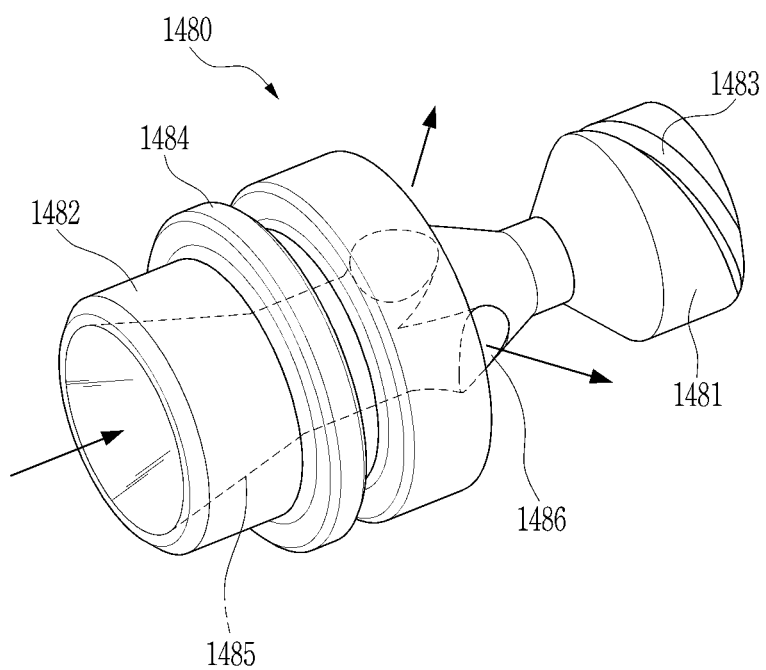
FIG. 7 is a perspective view illustrating a cartridge in accordance with the first embodiment of the present disclosure.

FIG. 7 is a perspective view illustrating a cartridge in accordance with the first embodiment of the present disclosure.

Referring to FIGS. 4 and 7, a cartridge 1480 is installed in the pilot fuel passage 1417. The cartridge 1480 includes a head 1481, and a guide tube 1482 coupled with the head 1481. A diverging passage 1484 is formed in the guide tube 1482. The head 1481 has an approximately cylindrical shape. A spiral guide groove 1483 is formed in an outer circumferential surface of the head 1481. In this embodiment, a plurality of the guide grooves 1483 are formed in the head 1481, and each of the guide grooves 1483 extends from a rear end of the head 1481 to a front end thereof.

An outer surface of the head 1481 comes into close contact with an outer surface of the second inner tube 1414 so that fuel can move only through the guide grooves 1483. The guide grooves 1483 spirally extend to enable the fuel to swirl. A front surface of the head 1481 may be formed of a planar surface, and a rear surface of the head 1481 may be formed of an inclined surface.

The diverging passage 1484 extending in a longitudinal direction of the guide tube 1482 is formed in the guide tube 1482. An inlet passage 1485 connected with the diverging passage 1484 is formed in a rear end of the guide tube 1482. A plurality of outlet passages 1486 connected with the diverging passage 1484 are formed in a circumferential surface of the guide tube 1482. The inlet passage 1485 may be formed such that an inner diameter thereof is gradually reduced from a rear end thereof to a front end.

In this embodiment, three outlet passages 1486 may be formed in the guide tube 1482. Each outlet passage 1486 may be formed to be inclined outward from a central portion of the guide tube 1482. The outer circumferential surface of the guide tube 1482 that has the outlet passages 1486 may be inclinedly formed such that an outer diameter of the guide tube 1482 becomes gradually smaller. The guide tube 1482 divides the flow of fuel into three flows. The divided fuel flows move along the guide groove 1483 formed in the head 1481 and swirl before being discharged through the injection hole 1432.

As described above, according to the first embodiment, the centrifugal flow chambers 1423 are formed in the nozzle tip 1420, and the swirl port 1424 that is eccentrically coupled to each centrifugal flow chamber 1423 injects main fuel while inducing the main fuel to swirl in the centrifugal flow chamber 1423. Therefore, the main fuel may be efficiently atomized.

Furthermore, according to the first embodiment, the heat shield cover 1430 is installed to cover the nozzle tip 1420. Hence, the nozzle tip 1420 may be prevented from being deteriorated by heat. In addition, the outer shield hole 1436 and the inner shield hole 1435 are formed in the heat shield cover 1430, so that air moves in a direction intersecting with fuel. Consequently, the fuel may be more effectively atomized.

Hereinafter, a nozzle in accordance with a second embodiment of the present disclosure will be described.

Figure 8:
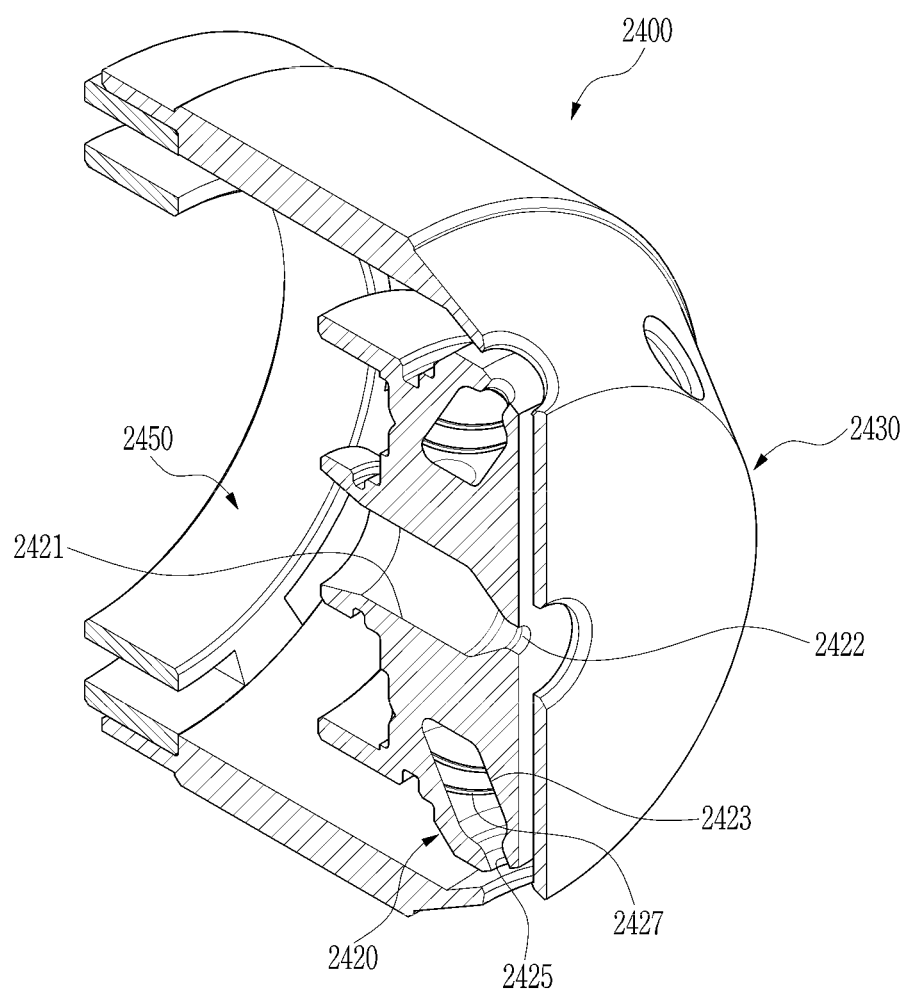
FIG. 8 is a sectional perspective view illustrating a nozzle in accordance with the second embodiment of the present disclosure.
Figure 9:
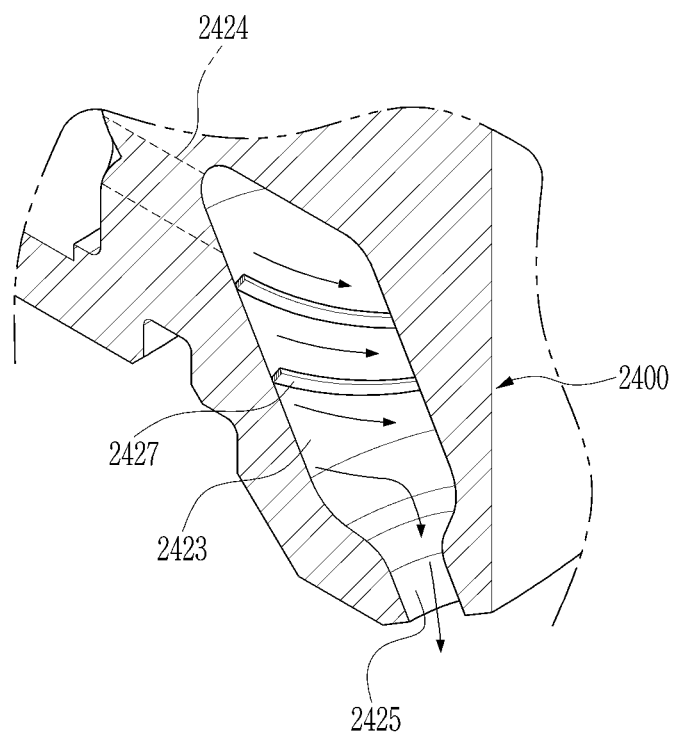
FIG. 9 is a sectional view illustrating the nozzle in accordance with the second embodiment of the present disclosure.

FIG. 8 is a sectional perspective view illustrating a nozzle 2400 in accordance with the second embodiment of the present disclosure, and FIG. 9 is a sectional view of the nozzle 2400 in accordance with the second embodiment of the present disclosure.

Referring to FIGS. 8 and 9, the structure of the nozzle 2400 in accordance with the second embodiment, except the structure of a centrifugal flow chamber 2423 in a nozzle tip 2420, is the same as that of the nozzle in accordance with the first embodiment; therefore, repetitive explanation of the same structure will be omitted.

The nozzle 2400 in accordance with the second embodiment includes a tube assembly, the nozzle tip 2420, and a heat shield cover 2430.

The nozzle tip 2420 is coupled with the tube assembly and functions to atomize and inject main fuel and pilot fuel. The heat shield cover 2430 is coupled with the outer tube and installed to cover the nozzle tip 2420. An injection passage 2421 and the plurality of centrifugal flow chambers 2423 are formed in the nozzle tip 2420. The injection passage 2421 is coupled with the pilot fuel passage. The plurality of centrifugal flow chambers 2423 are disposed outside the injection passage 2421 and coupled with the main fuel passage.

The injection passage 2421 is formed in a width-direction central portion of the nozzle tip 2420, and an inner injection hole 2422 is formed in a front end of the injection passage 2421. The plurality of centrifugal flow chambers 2423 are formed in the nozzle tip 2420. The centrifugal flow chambers 2423 are arranged at positions spaced apart from each other in a circumferential direction of the nozzle tip 2420. Each of the centrifugal flow chambers 2423 may be of a cylindrical shape.

A swirl port 2424 which couples the main fuel passage and the centrifugal flow chamber 2423 is formed in the nozzle tip 2424. The swirl port 2424 is formed at position spaced apart from a width-direction center of the centrifugal flow chamber 2423.

Furthermore, the swirl port 2424 may be coupled to the centrifugal flow chamber 2423 in a direction toward an inner wall of the centrifugal flow chamber 2423 or in a tangential direction of the inner wall. Therefore, main fuel may be ejected from the swirl port 2424 such that the main fuel is spirally moved along the inner wall of the centrifugal flow chamber 2423 by centrifugal force.

A guide rib 2427 for guiding the movement of main fuel may be formed in the centrifugal flow chamber 2423. The guide rib 2427 may spirally extend on the inner wall of the centrifugal flow chamber 2423 and guide the movement of the main fuel.

The centrifugal flow chamber 2423 may have an inner diameter greater by several times or several tens of times than that of the swirl port 2424. Main fuel which is ejected from the swirl port 2424 at a high pressure and a high speed may move along the inner wall of the centrifugal flow chamber 2423 and widely spread by centrifugal force and the guide rib 2427, and thus be converted into fine particles.

An outer injection hole 2425 is formed in the nozzle tip 2423. The outer injection hole 2425 is coupled with the centrifugal flow chamber 2423 so that fuel is injected into the combustor through the outer injection hole 2425. The outer injection hole 2425 is coupled with an approximately width-direction central portion of the centrifugal flow chamber 2423. An axial direction of the outer injection hole 2425 may be inclinedly formed outward from a central axis of the nozzle tip 2420.

As described above, according to the second embodiment, the guide rib 2427 that spirally extends is formed in the centrifugal flow chamber 2423, so that main fuel ejected from the swirl port 2424 may move along the inner wall of the centrifugal flow chamber 2423 and widely spread by an ejection pressure, centrifugal force, and the guide rib 2427, and thus be converted into fine particles. Thereafter, the main fuel may be sprayed through the outer injection hole 2425, thus forming finer particles.

Hereinafter, a nozzle in accordance with a third embodiment of the present disclosure will be described.

Figure 10:
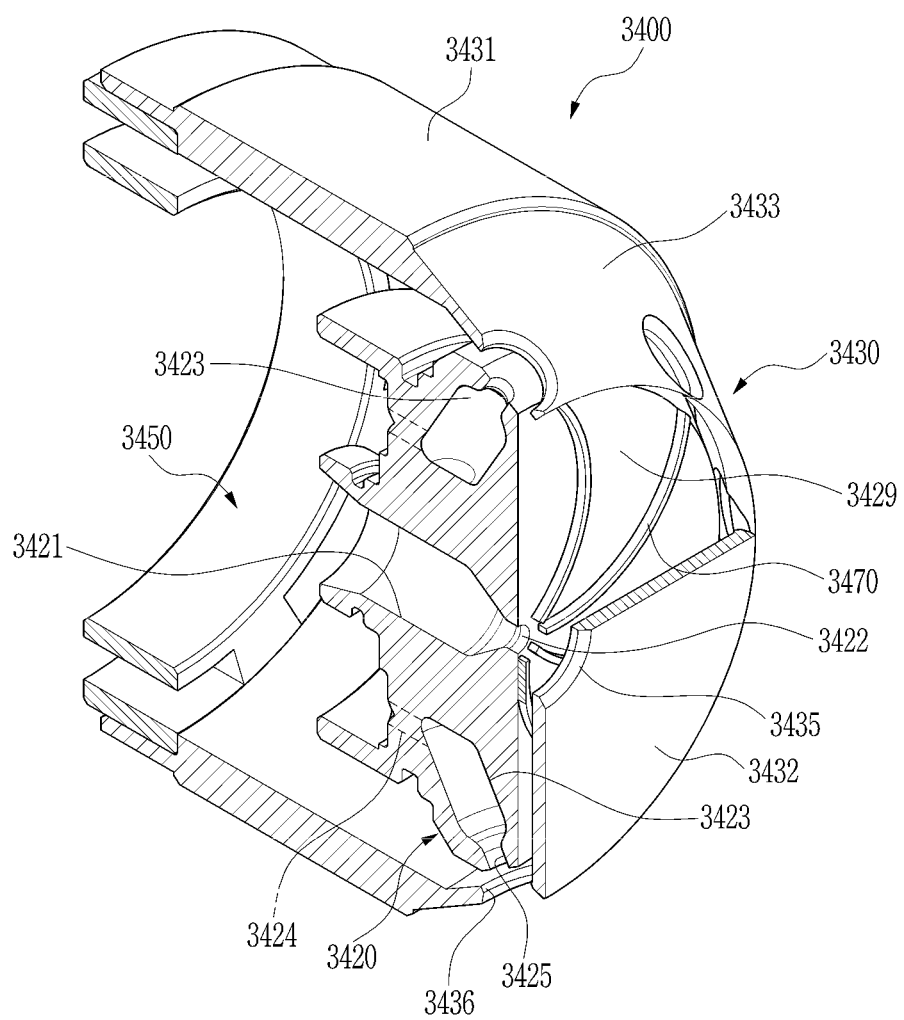
FIG. 10 is a sectional perspective view illustrating a nozzle in accordance with the third embodiment of the present disclosure.
Figure 11:
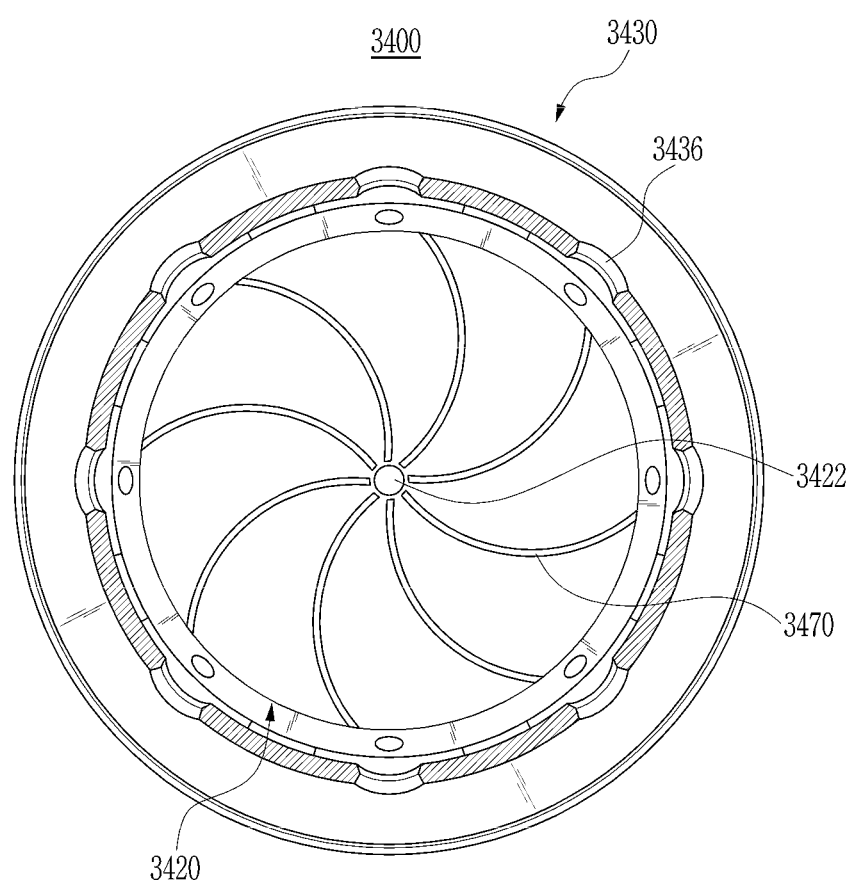
FIG. 11 is a sectional view of a front end of the nozzle in accordance with the third embodiment of the present disclosure.

FIG. 10 is a sectional perspective view illustrating a nozzle 3400 in accordance with the third embodiment of the present disclosure, and FIG. 11 is a sectional view of a front end of the nozzle 3400 in accordance with the third embodiment of the present disclosure.

Referring to FIGS. 10 and 11, the structure of the nozzle 3400 in accordance with the third embodiment, except the structure of a front-end surface 3429 of a nozzle tip 3420, is the same as that of the nozzle in accordance with the first embodiment; therefore, repetitive explanation of the same structure will be omitted.

The nozzle tip 3420 in accordance with the third embodiment is coupled with the tube assembly. An injection passage 3421 and a plurality of centrifugal flow chambers 3423 are formed in the nozzle tip 3420. The injection passage 3421 is coupled with the pilot fuel passage. The plurality of centrifugal flow chambers 3423 are disposed outside the injection passage 3421 and coupled with the main fuel passage.

An inner injection hole 3422 for injection of pilot fuel is formed in a front end of the injection passage 3421. A swirl port 3424 which couples the main fuel passage and the centrifugal flow chamber 3423 is formed in the nozzle tip 3420. An outer injection hole 3425 coupled with the centrifugal flow chamber 3423 to inject fuel into the combustor is formed in the nozzle tip 3420.

The heat shield cover 3430 is coupled with the outer tube and installed to cover the nozzle tip 3420. A flow guide member 3450 having a plurality of holes is installed between the heat shield cover 3430 and the outer tube. The heat shield cover 3430 includes a side surface 3431 which partially covers the first inner tube, a front surface 3432 which covers the front end of the nozzle tip 3420 and forms a cooling space 3460 between it and the front end of the nozzle tip 3420, and a connection surface 3433 which couples the side surface 3431 and the front surface 3432 and is inclinedly formed relative to the front surface 3432.

The heat shield cover 3430 is coupled with the air passage so that a passage through which air for cooling flows is formed between the heat shield cover 3430 and the nozzle tip 3420. An outer shield hole 3436 which discharges main fuel and air together is formed in the connection surface 3433. An inner shield hole 3435 which discharges pilot fuel and air together is formed in the front surface 3432.

A flow guide protrusion 3470 which guides the flow of air is formed between the front-end surface 3429 of the nozzle tip 3420 and the heat shield cover 3430. The flow guide protrusion 3470 protrudes from the front-end surface 3429 of the nozzle tip 3420 and extends in a curved line from an outer portion of the front-end surface 3429 toward a central portion thereof. In more detail, the flow guide protrusion 3470 may spirally extend from an outer side to an inner side. Hence, air that passes through space between the front-end surface 3429 of the nozzle tip 3420 and the front surface 3432 of the heat shield cover 3430 may form vortexes.

The flow guide protrusion 3470 is formed between the nozzle tip 3420 and the heat shield cover 3430, wherein the flow guide protrusion 3470 does not come into contact with the heat shield cover 3430, and an upper end of the flow guide protrusion 3470 is spaced apart from the heat shield cover 3430. Therefore, heat of the heat shield cover 3430 may be prevented from being transferred to the nozzle tip 3420 by thermal conduction.

Air may cool the nozzle tip 3420 while flowing along space defined inside the heat shield cover 3430. Furthermore, some of the air is discharged through the outer injection hole 3425, and the other air moves to a central portion of the heat shield cover 3430 and is discharged through the inner shield hole 3422.

If the flow guide protrusion 3470 is provided, as described in the third embodiment, air that is discharged through the inner shield hole 3435 forms vortexes. Consequently, pilot fuel that is ejected from the inner injection hole 3422 may be more effectively atomized.

While the present disclosure has been described with respect to the specific embodiments, it will be apparent to those skilled in the art that various changes or modifications of the present disclosure are possible by adding, changing, or deleting components without departing from the spirit and scope of the present disclosure as defined in the following claims. It should be noted that these changes or modifications also fall within the bounds of the present disclosure.

As described above, according to a nozzle, a combustor, and a gas turbine in accordance with an embodiment of the present disclosure, a plurality of centrifugal flow chambers is formed in the nozzle tip so that fuel may be efficiently atomized.

While the present disclosure has been described with respect to the specific embodiments, it will be apparent to those skilled in the art that various changes and modifications may be made without departing from the scope of the disclosure as defined in the following claims.

What is claimed is:

1. A nozzle for a combustor, the nozzle comprising:
    a tube assembly including an air passage through which air moves, a main fuel passage disposed inside the air passage so that main fuel moves through the main fuel passage, and a pilot fuel passage disposed inside the main fuel passage so that pilot fuel moves through the pilot fuel passage;
    a nozzle tip configured to eject the pilot fuel and the main fuel, the nozzle tip including an injection passage coupled with the pilot fuel passage, and a plurality of centrifugal flow chambers disposed outside the injection passage and communicating with the main fuel passage, each of the plurality of centrifugal flow chambers configured to form a vortex using centrifugal force, the vortex of each of the plurality of centrifugal flow chambers beginning at a bottom part of each of the plurality of centrifugal flow chambers and extending to a variable guide part of each of the plurality of centrifugal flow chambers, the bottom part formed on an upstream end of each of the plurality of centrifugal flow chambers and the variable guide part formed on a downstream end of each of the plurality of centrifugal flow chambers; and a swirl port formed in the nozzle tip in correspondence to one of each of the plurality of centrifugal flow chambers to couple the main fuel passage and the one of each of the plurality of centrifugal flow chambers, the swirl port having a tapered and horned shaped first end coupled to the main fuel passage and a tube-shaped second end that is formed opposite to the tapered and horned shaped first end and passes through a portion of the nozzle tip, the tube-shaped second end coupled to the bottom part of the one of each of the plurality of centrifugal flow chambers, wherein the tube-shaped second end of the swirl port is eccentrically coupled to the one of each of the plurality of centrifugal flow chambers at a position spaced apart from a width-direction center of the one of each of the plurality of centrifugal flow chambers, such that a central axis of the swirl port does not extend in a direction toward an axial center of the one of each of the plurality of centrifugal flow chambers.

2. The nozzle according to claim 1, wherein the tube assembly comprises:
an outer tube;
a first inner tube installed in the outer tube and configured to form the air passage between the first inner tube and the outer tube; and
a second inner tube installed in the first inner tube and configured to form the main fuel passage between the first inner tube and the second inner tube, with the pilot fuel passage formed in the second inner tube.

3. The nozzle according to claim 1, wherein the plurality of centrifugal flow chambers is arranged at positions spaced apart from each other in a circumferential direction of the nozzle tip.

4. The nozzle according to claim 1,
wherein each of the plurality of centrifugal flow chambers is of a pillar shape having a first cross-sectional area, and
wherein the tube-shaped second end of the swirl port has a second cross-sectional area smaller than the first cross-sectional area.

5. The nozzle according to claim 1, wherein each of the plurality of centrifugal flow chamber comprises:
an inner wall part of a tubular shape;
the bottom part coupled to a rear end of the inner wall part and disposed to be inclined relative to the inner wall part; and
the variable guide part coupled to a front end of the inner wall part and having an inner diameter that is gradually reduced toward a front end of the variable guide part.

6. The nozzle according to claim 5, wherein the central axis of the swirl port extends in a direction toward the inner wall part or in a tangential direction of the inner wall part.

7. The nozzle according to claim 1, further comprising:
an outer injection hole formed in the nozzle tip and coupled with the variable guide part in an axial direction to eject the main fuel,
wherein the outer injection hole coupled with the variable guide part extends in a radially outward direction, and
wherein the axial direction of the outer injection hole coupled with the variable guide part is inclined relative to a central axis of the nozzle tip.

8. The nozzle according to claim 2, further comprising:
a heat shield cover that covers the nozzle tip and is installed on the outer tube, and
a cooling space formed between the heat shield cover and a front end of the nozzle tip.

9. The nozzle according to claim 8, wherein the heat shield cover comprises:
a side surface partially covering the first inner tube;
a front surface covering a front end of the nozzle tip and forming the cooling space between the front surface and the front end of the nozzle tip; and
a connection surface coupling the side surface and the front surface and disposed to be inclined relative to the front surface, the connection surface forming a cooling flow passage between the connection surface and the nozzle tip.

10. The nozzle according to claim 9, wherein the heat shield cover further comprises:
an outer shield hole formed in the connection surface of the heat shield cover at a position spaced apart from the outer injection hole so that the main fuel and the air are discharged together through the outer shield hole, and
an inner shield hole formed in the front surface of the heat shield cover at a position spaced apart from a front end of the injection passage so that the pilot fuel and the air are discharged together through the inner shield hole.

11. The nozzle according to claim 8, further comprising:
a flow guide member installed between the heat shield cover and the tube assembly,
wherein the flow guide member comprises an inner wall having an annular shape, an outer wall spaced apart from the inner wall, and a plurality of partitions coupling the inner wall and the outer wall, and
wherein the plurality of partitions form a plurality of holes between the inner and outer walls.

12. The nozzle according to claim 9, further comprising a flow guide protrusion formed on a front end surface of the nozzle tip, the flow guide protrusion having a center and an outer portion and extending in a spiral shape from the center to the outer portion.

13. The nozzle according to claim 1, further comprising a guide rib extending in a spiral shape formed on an inner surface of each of the plurality of centrifugal flow chambers.

14. The nozzle according to claim 1, further comprising:
a cartridge that is installed in the pilot fuel passage and includes a head having an outer circumferential surface; and
a spiral guide groove that is formed in the outer circumferential surface of the head and extends in a spiral shape.

15. The nozzle according to claim 14,
wherein the cartridge further comprises a guide tube coupled with the head and a diverging passage formed in the guide tube,
wherein an inlet passage coupled with the diverging passage is formed in a rear end of the guide tube, and wherein the guide tube has a circumferential surface in which a plurality of outlet passages coupled with the diverging passage are formed.

16. A combustor comprising a burner having a plurality of nozzles configured to eject fuel and air, and a duct assembly coupled to one side of the burner and configured to combust the fuel and the air therein and transfer combustion gas to a turbine, wherein the nozzle comprises:
a tube assembly including an air passage through which the air moves, a main fuel passage disposed inside the air passage so that main fuel moves through the main fuel passage, and a pilot fuel passage disposed inside the main fuel passage so that pilot fuel moves through the pilot fuel passage;
a nozzle tip configured to eject the pilot fuel and the main fuel, and including an injection passage coupled with the pilot fuel passage, and a plurality of centrifugal flow chambers disposed outside the injection passage and communicating with the main fuel passage, each of the plurality of centrifugal flow chambers configured to form a vortex using centrifugal force, the vortex of each of the plurality of centrifugal flow chambers beginning at a bottom part of each of the plurality of centrifugal flow chambers and extending to a variable guide part of each of the plurality of centrifugal flow chambers, the bottom part formed on an upstream end of each of the plurality of centrifugal flow chambers and the variable guide part formed on a downstream end of each of the plurality of centrifugal flow chambers;
a swirl port formed in the nozzle tip in correspondence to one of each of the plurality of centrifugal flow chambers to couple the main fuel passage and the one of each of the plurality of centrifugal flow chambers, the swirl port having a tapered and horned shaped first end coupled to the main fuel passage and a tube-shaped second end that is formed opposite to the tapered and horned shaped first end and passes through a portion of the nozzle tip, the tube-shaped second end coupled to the bottom part of the one of each of the plurality of centrifugal flow chambers; and
a heat shield cover coupled with the air passage and installed to cover the nozzle tip, the heat shield cover configured to form a cooling space between the heat shield cover and a front end of the nozzle tip and form a cooling flow passage between the heat shield cover and a side surface of the nozzle tip,
wherein the tube-shaped second end of the swirl port is eccentrically coupled to the one of each of the plurality of centrifugal flow chambers at a position spaced apart from a width-direction center of the one of each of the plurality of centrifugal flow chambers, such that a central axis of the swirl port does not extend in a direction toward an axial center of the one of each of the plurality of centrifugal flow chambers.

17. The combustor according to claim 16, wherein the tube assembly comprises:
an outer tube;
a first inner tube installed in the outer tube and configured to form the air passage between the first inner tube and the outer tube;
a second inner tube installed in the first inner tube and configured to form the main fuel passage between the first inner tube and the second inner tube, with the pilot fuel passage formed in the second inner tube.

18. A gas turbine comprising a compressor configured to compress air drawn into the compressor from an outside, a combustor configured to mix fuel with the air compressed by the compressor and combust a mixture of the fuel and the air compressed by the compressor, and a turbine including a plurality of turbine blades configured to be rotated by combustion gas formed by the combustor, wherein the combustor comprises a burner having a plurality of nozzles configured to eject the fuel and the air, and a duct assembly coupled to one side of the burner and configured to combust the fuel and the air therein and transfer the combustion gas to a turbine, and
wherein the nozzle comprises:
a tube assembly including an air passage through which the air moves, a main fuel passage disposed inside the air passage so that main fuel moves through the main fuel passage, and a pilot fuel passage disposed inside the main fuel passage so that pilot fuel moves through the pilot fuel passage; and
a nozzle tip configured to eject the pilot fuel and the main fuel, and including an injection passage coupled with the pilot fuel passage, and a plurality of centrifugal flow chambers disposed outside the injection passage and communicating with the main fuel passage, each of the plurality of centrifugal flow chambers configured to form a vortex using centrifugal force, the vortex of each of the plurality of centrifugal flow chambers beginning at a bottom part of each of the plurality of centrifugal flow chambers and extending to a variable guide part of each of the plurality of centrifugal flow chambers, the bottom part formed on an upstream end of each of the plurality of centrifugal flow chambers and the variable guide part formed on a downstream end of each of the plurality of centrifugal flow chambers; and
a swirl port formed in the nozzle tip in correspondence to one of each of the plurality of centrifugal flow chambers to couple the main fuel passage and the one of each of the plurality of centrifugal flow chambers, the swirl port having a tapered and horned shaped first end coupled to the main fuel passage and a tube-shaped second end that is formed opposite to the tapered and horned shaped first end and passes through a portion of the nozzle tip, the tube-shaped second end coupled to the bottom part of the one of each of the plurality of centrifugal flow chambers, and
wherein the tube-shaped second end of the swirl port is eccentrically coupled to the one of each of the plurality of centrifugal flow chambers at a position spaced apart from a width-direction center of the one of each of the plurality of centrifugal flow chambers, such that a central axis of the swirl port does not extend in a direction toward an axial center of the one of each of the plurality of centrifugal flow chambers.

19. The gas turbine according to claim 18, wherein the tube assembly comprises:
an outer tube;
a first inner tube installed in the outer tube and configured to form the air passage between the first inner tube and the outer tube;
a second inner tube installed in the first inner tube and configured to form the main fuel passage between the first inner tube and the second inner tube, with the pilot fuel passage formed in the second inner tube.

20. The gas turbine according to claim 18, wherein each of the plurality of centrifugal flow chamber comprises:
    an inner wall part having a tubular shape;
    the variable guide part coupled to a front end of the inner wall part and having an inner diameter that is gradually reduced toward a front end of the variable guide part.

\* \* \* \* \*